United States Patent
You et al.

(10) Patent No.: US 11,516,726 B2
(45) Date of Patent: Nov. 29, 2022

(54) DATA TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Xin You, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/183,244

(22) Filed: Feb. 23, 2021

(65) Prior Publication Data
US 2021/0176695 A1   Jun. 10, 2021

Related U.S. Application Data

(63) Continuation of application No. PCT/CN2018/108071, filed on Sep. 27, 2018.

(51) Int. Cl.
*H04W 4/00* (2018.01)
*H04W 40/36* (2009.01)

(52) U.S. Cl.
CPC .................. *H04W 40/36* (2013.01)

(58) Field of Classification Search
None
See application file for complete search history.

(56) References Cited

U.S. PATENT DOCUMENTS

| 2010/0091734 | A1 | 4/2010 | Park et al. | |
|---|---|---|---|---|
| 2011/0149905 | A1 | 6/2011 | Kim | |
| 2012/0142354 | A1* | 6/2012 | Ahluwalia | H04W 36/0072 455/436 |
| 2012/0163342 | A1 | 6/2012 | Ahluwalia | |
| 2014/0038605 | A1* | 2/2014 | Behnamfar | H04W 36/0061 455/436 |
| 2016/0192261 | A1 | 6/2016 | Wang et al. | |
| 2019/0104452 | A1* | 4/2019 | Park | H04L 5/0055 |

(Continued)

FOREIGN PATENT DOCUMENTS

| CN | 102300279 A | 12/2011 |
|---|---|---|
| CN | 104469873 A | 3/2015 |

(Continued)

OTHER PUBLICATIONS

3GPP "3rd Generation Partnership Project; Technical Specification Group Radio Access Network; Evolved Universal Terrestrial Radio Access and Evolved Universal Terrestrial Radio Access Network; Overall description; Stage 2 (Release 13)" 3GPP TS 36.300 V13.9.0; (Sep. 2017). 313 pages.

(Continued)

*Primary Examiner* — Suhail Khan
(74) *Attorney, Agent, or Firm* — Perkins Coie LLP

(57) ABSTRACT

Provided are a data transmission method, a terminal device, a network device, a chip, a computer readable storage medium, a computer program product and a computer program. The data transmission method includes: when it is determined that a terminal device is successfully handed over to a target network device, forwarding data to the target network device.

10 Claims, 5 Drawing Sheets

(56) References Cited

U.S. PATENT DOCUMENTS

| | | | | |
|---|---|---|---|---|
| 2019/0116541 A1* | 4/2019 | Hong | .................... | H04W 76/27 |
| 2021/0051539 A1* | 2/2021 | Zhang | .................... | H04W 36/38 |
| 2021/0297909 A1* | 9/2021 | Lee | .................... | H04W 36/0061 |

FOREIGN PATENT DOCUMENTS

| | | | |
|---|---|---|---|
| CN | 106604335 | A | 4/2017 |
| EP | 2838291 | A1 | 2/2015 |
| EP | 3174337 | A1 | 5/2017 |
| EP | 3742797 | A1 | 11/2020 |
| KR | 20130012761 | A | 2/2013 |
| KR | 20150016096 | A | 2/2015 |
| KR | 20170120035 | A | 10/2017 |
| WO | 2014194457 | A1 | 12/2014 |
| WO | 2017183897 | A1 | 10/2017 |

OTHER PUBLICATIONS

EPO, Extended European Search Report for European Patent Application No. 18934638.0. dated Jun. 16, 2021. 10 pages.
International Search Report dated Jun. 4, 2019 cited in PCT/CN2018/108071.
3GPP, "3GPP TS 38.300, NR and NG-RAN Overall Description, Stage 2" Jun. 2018. 87 pages.
3GPP, "3GPP TS 38.331, Radio Resource Control Protocol Specification" Jun. 2018. 304 pages.
Intel Corporation "NR Mobility Enhancements—RP-181433" 3GPP TSG RAN Meeting 80, May 2018, 5 pages.
Examination Report for Australian Application No. 2018442732 dated Nov. 16, 2021. 4 pages.
Examination Report for Indian Application No. 202117007386 dated Jan. 27, 2022. 5 pages with English translation.
Examination Report No. 2 for Australian Application No. 2018442732 dated Apr. 20, 2022. 3 pages.
First Office Action for Chinese Application No. 202110408899.0 dated May 25, 2022. 19 pages with English translation.
Huawei et al. "Further discussion on Conditional HO" R2-1802472; 3GPP TSG-RAN2 Meeting #101; Athens, Greece Feb. 26-Mar. 2, 2018. 3 pages.
Lenovo et al. "Conditional handover in NR" R2-1709067; 3GPP TSG-RAN WG2 Meeting #99; Berlin, Germany; Aug. 21-25, 2017. 3 pages.
Notice of Reasons for Refusal for Japanese Application No. 2021-513400 dated Apr. 22, 2022. 8 pages with English translation.
Notification of Reason for Refusal for Korean Application No. 10-2021-7006184 dated Mar. 31, 2022 9 pages with English translation.
Notice of Reasons for Refusal for Japanese Application No. 2021-513400 dated Oct. 7, 2022. 8 pages with English translation.
Request for the Submission of an Opinion for Korean Application No. 10-2021-7006184 dated Oct. 19, 2022. 11 pages with English translation.

* cited by examiner

When it is determined that a terminal device is successfully handed over to a target network device, forward data to the target network device — 201

DATA TRANSMISSION METHOD, TERMINAL DEVICE AND NETWORK DEVICE

CROSS-REFERENCE TO RELATED APPLICATION

This application is a continuation application of International PCT Application No. PCT/CN2018/108071 filed on Sep. 27, 2018, the entire content of which is hereby incorporated by reference.

TECHNICAL FIELD

The present disclosure relates to the technical field of information processing, in particular to a data transmission method, a terminal device, a network device, a chip, a computer readable storage medium, a computer program product and a computer program.

BACKGROUND

In mobile communication processing, a handover failure may occur during a handover process. In an existing handover, a terminal device stops data transmission with a source network device upon receiving a handover command from the source network device, and the source network device will send a status report of received data to a target network device. However, when there are more handover scenarios, how to control data transmission between a source network device and a target network device is a problem to be solved.

SUMMARY

Embodiments of the present disclosure provide a data transmission method, a terminal device, a network device, a chip, a computer readable storage medium, a computer program product and a computer program.

In a first aspect, an embodiment of the present disclosure provides a data transmission method, which is applied to a source network device, the method including: forwarding data to a target network device when determining that a terminal device is successfully handed over to the target network device.

In a second aspect, an embodiment of the present disclosure provides a data transmission method, which is applied to a source network device, the method including: forwarding data to at least one target network device.

In a third aspect, an embodiment of the present disclosure provides a data transmission method, which is applied to a target network device, the method including: receiving data forwarded by a source network device, when determining that a terminal device is successfully handed over to the target network device.

In a fourth aspect, an embodiment of the present disclosure provides a data transmission method, which is applied to a target network device, the method including: receiving data forwarded by a source network device, wherein the target network device is one of at least one target network device configured by a network side for a terminal device.

In a fifth aspect, an embodiment of the present disclosure provides a source network device, including a first processing unit and a first communication unit. The first processing unit forwards data to a target network device via the first communication unit, when determining that a terminal device is successfully handed over to the target network device. The first communication unit is configured to send data to the target network device.

In a sixth aspect, an embodiment of the present disclosure provides a source network device, including a second communication unit. The second communication unit forwards data to at least one target network device.

In a seventh aspect, an embodiment of the present disclosure provides a target network device, including a third processing unit and a third communication unit. The third processing unit receives, via the third communication unit, data forwarded by a source network device, when determining that a terminal device is successfully handed over to the target network device. The third communication unit receives data sent by the source network device.

In an eighth aspect, an embodiment of the present disclosure provides a target network device, including a fourth communication unit. The fourth communication unit receives data forwarded by a source network device, wherein the target network device is one of at least one target network device configured by a network side for a terminal device.

In a ninth aspect, an embodiment of the present disclosure provides a network device, including a processor and a memory. The memory is configured to store a computer program, and the processor is configured to call and run the computer program stored in the memory to perform the method in the fourth aspect or in each implementation thereof.

In a tenth aspect, there is provided a chip for implementing the method in any one of the first to fourth aspects or in each implementation thereof.

Specifically, the chip includes a processor for calling and running a computer program from a memory, to enable a device in which the chip is installed to perform the method in any one of the first to second aspects or in each implementation thereof.

In an eleventh aspect, there is provided a computer readable storage medium for storing a computer program that enables a computer to perform the method in any one of the first to fourth aspects or in each implementation thereof.

In a twelfth aspect, there is provided a computer program product, including computer program instructions that enable a computer to perform the method in any one of the first to fourth aspects or in each implementation thereof.

In a thirteenth aspect, there is provided a computer program which, when run on a computer, enables the computer to perform the method in any one of the first to fourth aspects or in each implementation thereof.

DETAILED DESCRIPTION

The technical solutions in embodiments of the present application will be described below with reference to the drawings in embodiments of the present application. It is apparent that the embodiments described are just some embodiments of the present application, but not all embodiments of the present application. According to the embodiments of the present application, all other embodiments achieved by a person of ordinary skills in the art without paying an inventive effort are within the protection scope of the present application.

The technical solutions of the embodiments of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD), LTE Time Division Duplex (TDD), a Universal Mobile Telecommunication System (UMTS), a Worldwide Interoperability for Microwave Access (WiMAX) communication system, a 5G system, etc.

Figures 1, 2:
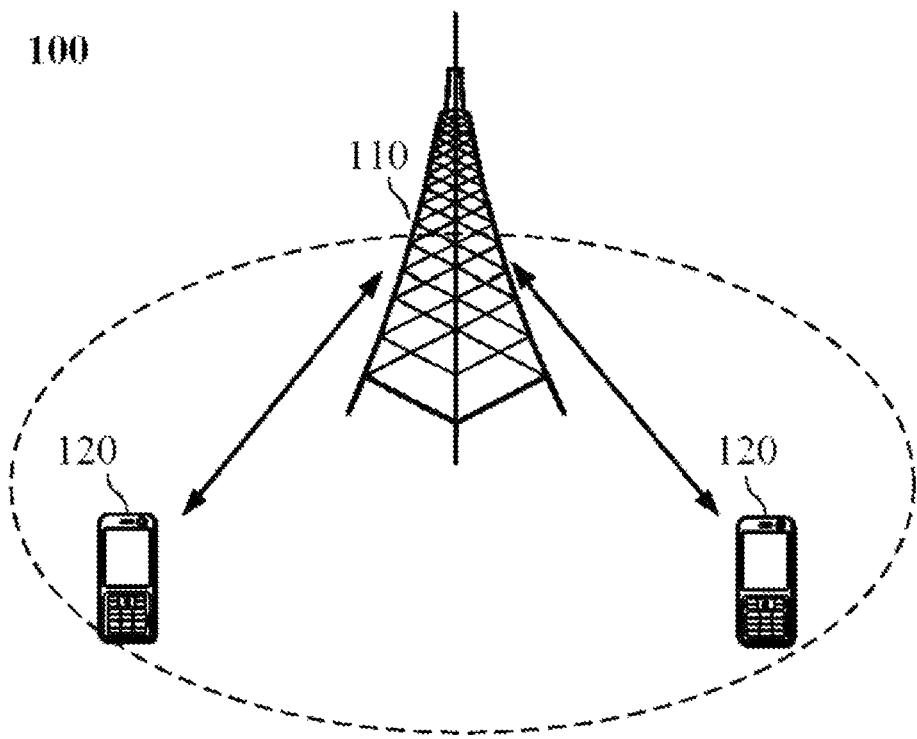
FIG. 1 is a first schematic diagram of an architecture of a communication system according to an embodiment of the present application.
FIG. 2 is a first schematic flowchart of a data transmission method according to an embodiment of the present application.

Illustratively, a communication system 100 applied in an embodiment of the present application may be as shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a network device (Base Transceiver Station (BTS)) in a GSM system or CDMA system, a network device (NodeB (NB)) in a WCDMA system, an Evolutional network device (Evolutional Node B (eNB or eNodeB)) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 further includes at least one terminal device 120 located within the coverage area of the network device 110. As used herein, the term "terminal device" includes, but is not limited to, a device configured to receive/send a communication signal via a wired line, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, and an AM-FM broadcast transmitter; and/or another terminal device, and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communications System (PCS) terminal capable of combining a cellular wireless telephone and data processing, faxing, and data communication abilities, a PDA that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, User Equipment (terminal device), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, Device to Device (D2D) communication may be performed between the terminal devices 120.

Optionally, a 5G system or a 5G network can also be called a New Radio (NR) system or a NR network.

FIG. 1 shows one network device and two terminal devices as an example. Optionally, the communication system 100 may include a plurality of network devices, and other quantities of terminal devices may be included within the coverage area of each network device, and this is not limited in the embodiments of the present application.

Optionally, the communication system 100 may further include other network entities such as a network controller and a mobile management entity, which is not limited in the embodiments of the present application.

It should be understood that devices with communication function in a network/system may be referred to as communication devices in the embodiments of the present application. Taking the communication system 100 shown in FIG. 1 as an example, communication devices may include a network device 110 and a terminal device 120 which have communication function, and the network device 110 and the terminal device 120 may be the specific devices described above, which will not be described here again. The communication devices may also include other devices in the communication system 100, e.g., other network entities such as a network controller and a mobile management entity, which is not limited in the embodiments of the present application.

It should be understood that the terms "system" and "network" are often used interchangeably here. The term "and/or" herein is merely an association relationship describing associated objects, indicating that there may be three relationships, for example, A and/or B may indicate three cases: A alone, A and B, and B alone. In addition, the symbol "/" herein generally indicates that objects before and after the symbol "/" have an "or" relationship.

In order to understand features and technical contents of embodiments of the present disclosure in more detail, implementations of the embodiments of the present disclosure will be described in detail below with reference to accompanying drawings, and the accompanying drawings are used for reference only and are not intended to limit the embodiments of the present disclosure.

Embodiment I

An embodiment of the present disclosure provides a data transmission method, which is applied to a source network device, and as shown in FIG. 2, the method includes act 201.

In act 201, data is forwarded to a target network device, when it is determined that a terminal device is successfully handed over to the target network device.

This embodiment may be applied to the following scenarios: one is that the terminal device acquires at least one target network device, then selects one target network device from the at least one target network device and initiates a handover connection to the selected target network device, at this time, the terminal device may maintain the connection with the source network device, or may disconnect from the source network device; and the other is that the source network device determines at least one network device that the terminal device can access, then selects a target network device from the at least one network device for the terminal device, and sends the selected target network device to the terminal device, so that the terminal device can initiate a connection to the target network device, at this time, the source network device may also maintain the connection with the terminal device, and of course, may alternatively disconnect from the terminal device.

Before forwarding data to the target network device, or when it is determined that the terminal device is successfully handed over to the target network device, the method further includes: receiving identity information of the target network device.

The way of receiving identity information of the target network device may be as follows: when the source network device maintains connection with the terminal device, receiving identity information, sent by the terminal device, of the target network device to which the terminal device is successfully handed over; or receiving identity information sent by the target network device; when the source network device is disconnected from the terminal device, receiving identity information sent by the target network device. The target network device may carry the identity information through network signaling or indication information.

The forwarding data to the target network device includes: forwarding uplink data and/or downlink data to the target network device.

Figure 3:
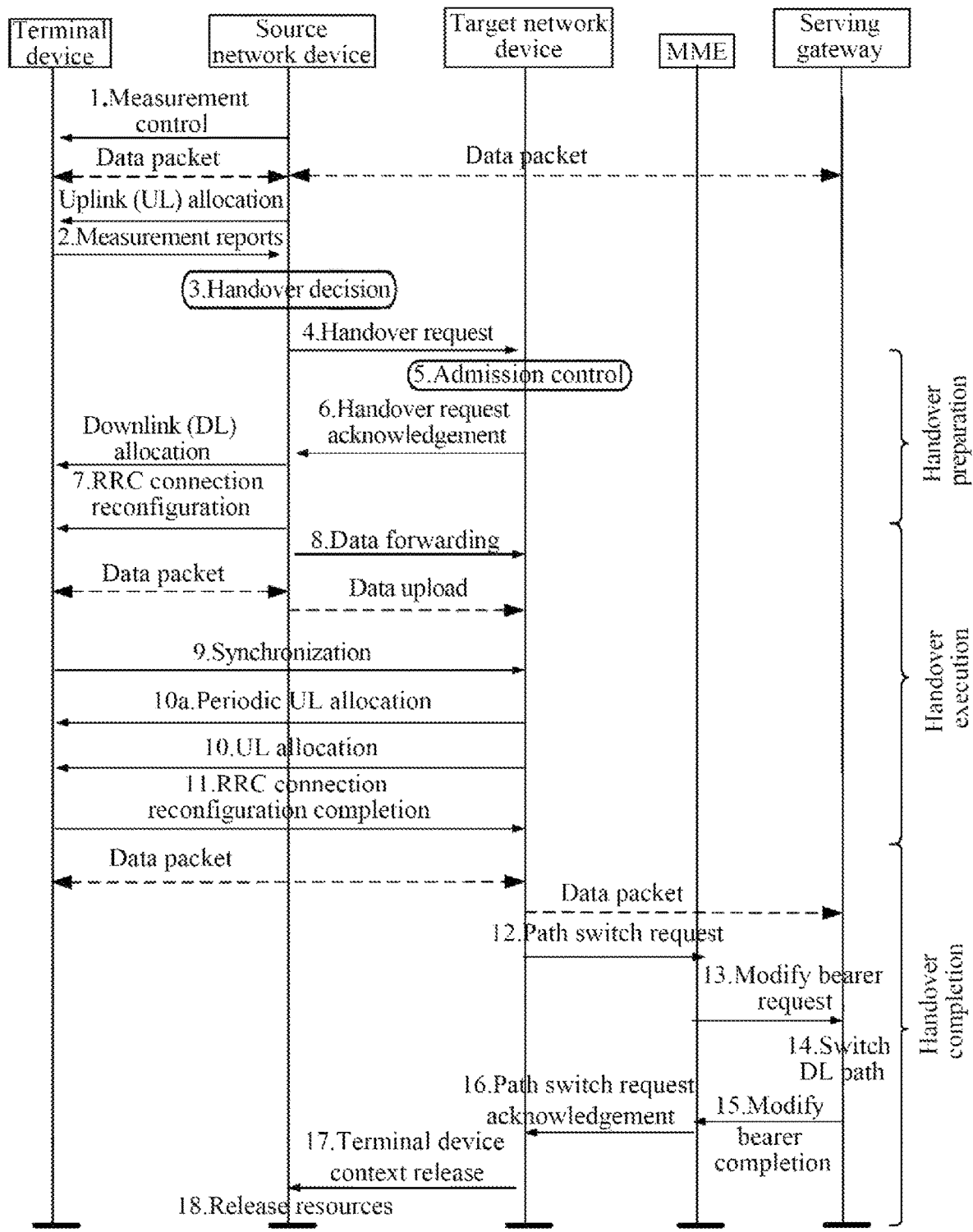
FIG. 3 is a schematic diagram of a handover processing scenario according to an embodiment of the present disclosure.

As to the processing of forwarding data, reference may be made to the following processing flow. The source network device may acquire corresponding information of the target network device from at least one target network device. The flow of handover and acquiring relevant information may be as shown in FIG. 3, which includes a handover preparation stage, a handover execution stage and a handover completion stage.

The handover preparation stage includes acts 1-6 in the figure. The source network device sends a measurement control to the terminal device. The terminal device sends measurement reports to the source network device after performing measurements for a plurality of network devices or cells. The source network device makes a handover decision according to the measurement reports (or combined with Radio Resource Management (RRM) information). The source network device sends a handover request to the target network device so that the target network device is ready for handover. The target network device performs a handover permission control according to the handover request. When determining to perform handover, the target network device sends handover request acknowledgement to the source network device.

The process then proceeds to the handover execution stage, which includes acts 7-11 in the figure. Specifically, the target network device generates Radio Resource Control (RRC) information, and sends RRC connection reconfiguration information to the source network device, and the source network device sends the RRC connection reconfiguration information to the terminal device. After receiving the RRC connection reconfiguration information, the terminal device performs handover processing according to the connection reconfiguration information. The source network device then forwards data to the target network device. The terminal device synchronizes with the target network device, then receives a UL allocation performed by the target network device and sends RRC connection reconfiguration completion information to the target network device.

The process finally proceeds to the handover completion stage, which includes acts 12-18 in the figure. Specifically, the target network device sends a path switch request to MME to inform the MME of the cell change of the terminal device. The MME sends a modify bearer request to a serving gateway, and the serving gateway performs processing of switching a downlink path. After the serving gateway completes the processing, it sends modify bearer completion information to the MME, and the MME sends an acknowledgement message of the path switch request to the target network device. The target network device informs the source network device of terminal device context release, and the source network device releases resources.

The forwarding data to the target network device further includes at least one of the following: sending a data status report to the target network device; sending a Serial Number (SN) of a data packet on the source network device side to the target network device; or sending Data Radio Bearer (DRB) configuration to the target network device.

Specifically, information forwarded by the source network device to the target network device may include SN status transmission information. The SN status information includes an uplink Packet Data Convergence Protocol (PDCP) SN reception status, a downlink PDCP SN transmission status, and the like. Further, the uplink PDCP SN reception status includes at least the first lost uplink Service Data Unit (SDU) of the PDCP SN, and may include a bitmap about an out-of-order reception status of uplink SDUs; and the downlink PDCP SN transmission status may include the next PDCP SN, which is a new SDU the target network device is about to allocate. In addition, other information will not be exhaustively listed here.

Further, it should be noted that a scenario of this embodiment includes a case where the terminal device maintains connection with the source network device during handover, at this time, the target network device may be a secondary node (SN), and the source network device is a master node (MN). It should be noted here that in a Long Term Evolution (LTE) system, SN is called SCG, and in New Radio (NR), it is SN, and they refer to the same concept, i.e., a second serving network device in a Dual Connectivity (DC) scenario. Specifically, connection states of the terminal device may be: the terminal device maintains a connection with the source network device and fails to be connected with the target network device; the terminal device is disconnected from the source network device and is successfully connected with the target network device; and the terminal device fails to be connected with a Secondary Cell Group (SCG), and SCG fails to change connection. Of course, there may also be: in a scenario where there are a plurality of SCGs configured, the terminal device fails to be connected to an SCG; and in a scenario where there are a plurality of target cells configured, the terminal device fails to be connected to a target cell. There may be other applicable scenarios, which, however, will not be exhaustively listed in this embodiment.

In addition, in the above scenarios, when initiating a connection to a first target network device while maintaining the connection with the source network device, the terminal device in this embodiment may reserve the connection with the source network device. The terminal device reserves a first protocol stack and a first related key with the source network device, and maintains a second protocol stack and a second related key with the first target network device, wherein the first related key is different from the second related key. The second related key may be generated by the first related key.

The first protocol stack and the second protocol stack may be the same or different, or at least partially different. For example, for a 5G system, different Service Data Adaptation Protocols (SDAP), different Packet Data Convergence Protocols (PDCP), different Radio Link Control (RLC) protocols, different Media Access Control (MAC) entities and different low layer entities may be maintained between the terminal device and the source network device, and between the terminal device and the first target network device. For a 4G system, different Packet Data Convergence Protocols (PDCP), different Radio Link Control (RLC) protocols, different Media Access Control (MAC) entities and different low layer entities may be maintained between the terminal device and the source network device, and between the terminal device and the first target network device. In addition, in a solution provided in this embodiment, in order to ensure the use of different keys, the PDCPs of the first protocol stack and the second protocol stack must be different. At least one of SDAPs, RLCs, MACs or physical layers may be the same or different. Alternatively, the first protocol stack and the second protocol stack may share at least one of SDAP, RLC, MAC or physical layer, or may each have a SDAP, RLC, MAC and physical layer.

In another scenario of this embodiment, the source network device may configure a plurality of target network devices for the terminal device. In this case, before the forwarding data to the target network device when it is determined that the terminal device is successfully handed over to the target network device, the method further includes: sending a handover command to the terminal device, wherein the handover command is used for indicating at least one target network device to the terminal device. That is, when the source network device configures a plurality of target network devices for the terminal device, correspondingly, the terminal device will select one of them as a target network device to which connection is initiated currently, and at this time, the terminal device may maintain connection with the source network device or may disconnect from the source network device.

The handover command contains a reconfiguration message of at least one target network device. The source network device may select to send reconfiguration messages of a plurality of target network devices to the terminal device at one time, or send a reconfiguration message of only one target network device at one time, but perform sending a plurality of times. For example, after the handover to one target network device fails, the source network device further sends a reconfiguration message of another new target network device, which will not be described further.

As can be seen, by adopting the above solution, data transmission may be performed from a source network device to a target network device, after a terminal device is successfully connected with the target network device. In this way, this solution proposes a new scenario in which data is sent by a source network device, thus making this solution applicable to more handover scenarios.

Embodiment II

Figure 4:
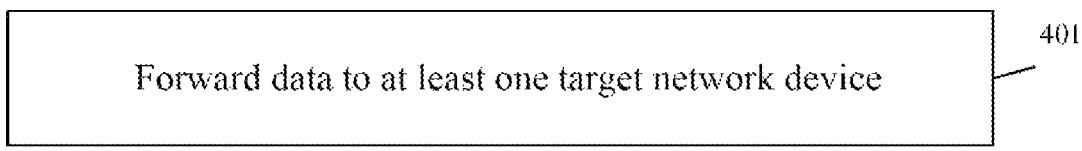
FIG. 4 is a second schematic flowchart of a data transmission method according to an embodiment of the present application.

An embodiment of the present disclosure provides a data transmission method, which is applied to a source network device, and as shown in FIG. 4, the method includes act 401.

In act 401, data is forwarded to at least one target network device.

Different from Embodiment I, in this embodiment, there is no such restriction that the terminal device needs to successfully establish a connection with the target network device in order to send data, instead, the terminal device directly sends data to a plurality of target network devices.

This embodiment may be applied to the scenario that the terminal device acquires at least one target network device, then selects one target network device from the at least one target network device and initiates a handover connection to the selected target network device, at this time, the terminal device may maintain the connection with the source network device, or may disconnect from the source network device.

The forwarding data to the target network device includes: forwarding uplink data and/or downlink data to the target network device.

As to the processing of forwarding data, reference may be made to the following processing flow. The source network device may acquire corresponding information of the target network device from at least one target network device. The flow of handover and acquiring relevant information may be as shown in FIG. 3, which includes a handover preparation stage, a handover execution stage and a handover completion stage.

The handover preparation stage includes acts 1-6 in the figure. The source network device sends a measurement control to the terminal device. The terminal device sends measurement reports to the source network device after performing measurements for a plurality of network devices or cells. The source network device makes a handover decision according to the measurement reports (or combined with RRM information). The source network device sends a handover request to the target network device so that the target network device is ready for handover. The target network device performs a handover permission control according to the handover request. When determining to perform handover, the target network device sends handover request acknowledgement to the source network device.

The process then proceeds to the handover execution stage, which includes acts 7-11 in the figure. Specifically, the target network device generates RRC information, and sends RRC connection reconfiguration information to the source network device, and the source network device sends the RRC connection reconfiguration information to the terminal device. After receiving the RRC connection reconfiguration information, the terminal device performs handover processing according to the connection reconfiguration information. The source network device then forwards data to the target network device. The terminal device synchronizes with the target network device, then receives UL allocation performed by the target network device for, and sends RRC connection reconfiguration completion information to the target network device.

The process finally proceeds to the handover completion stage, which includes acts 12-18 in the figure. Specifically, the target network device sends a path switch request to MME to inform the MME of the cell change of the terminal device. The MME sends a modify bearer request to a serving gateway, and the serving gateway performs processing of switching a downlink path. After the serving gateway completes the processing, it sends modify bearer completion information to the MME, and the MME sends an acknowledgement message of the path switch request to the target network device. The target network device informs the source network device of terminal device context release, and the source network device releases resources.

The forwarding data to the target network device further includes at least one of the following: sending a data status report to the target network device; sending a Serial Number (SN) of a data packet on the source network device side to the target network device; or sending Data Radio Bearer (DRB) configuration to the target network device.

Specifically, information forwarded by the source network device to the target network device may include SN status transmission information. The SN status information includes an uplink Packet Data Convergence Protocol (PDCP) SN reception status, a downlink PDCP SN transmission status, and the like. Further, the uplink PDCP SN reception status includes at least the first lost uplink SDU of the PDCP SN, and may also include a bitmap about an out-of-order reception status of uplink SDUs; and the downlink PDCP SN transmission status may include the next PDCP SN, which is a new SDU the target network device is about to allocate. In addition, other information will not be exhaustively listed here.

Further, it should be noted that the target network device may be a secondary node (SN), and the source network device is a master node (MN). It should be noted here that in a Long Term Evolution (LTE) system, SN is called SCG, and in New Radio (NR), it is SN, and they refer to the same concept, i.e., a second serving network device in a DC scenario. Specifically, the connection states of the terminal device may be: the terminal device maintains a connection with the source network device and fails to be connected with the target network device; the terminal device is disconnected from the source network device and is successfully connected with the target network device; and the terminal device fails to be connected with a Secondary Cell Group (SCG), and SCG fails to change connection. Of course, there may also be: in a scenario where there are a plurality of SCGs configured, the terminal device fails to be connected to an SCG; and in a scenario where there are a plurality of target cells configured, the terminal device fails to be connected to a target cell. There may also be other applicable scenarios, which, however, will not be exhaustively listed in this embodiment.

In a scenario of this embodiment, the source network device may configure a plurality of target network devices for the terminal device. In this case, before the forwarding data to at least one target network device, the method further includes: sending a handover command to the terminal device, wherein the handover command is used for indicating the at least one target network device to the terminal device.

That is, when the source network device configures a plurality of target network devices for the terminal device, correspondingly, the terminal device will select one of them as a target network device to which connection is initiated currently, and at this time, the terminal device may maintain connection with the source network device or may disconnect from the source network device.

The handover command contains a reconfiguration message of at least one target network device. The source network device may select to send reconfiguration messages of a plurality of target network devices to the terminal device at one time, or send a reconfiguration message of only one target network device at one time, but perform sending a plurality of times. For example, after the handover to one target network device fails, the source network device further sends a reconfiguration message of another new target network device, which will not be described further.

As can be seen, by adopting the above solution, a source network device may directly transmit data to at least one target network device of a terminal device. In this way, this solution proposes a new scenario in which data is sent by a source network device, thus making this solution applicable to more handover scenarios. Moreover, since the source network device can directly send data to the target network device, in this solution, the process of acquiring relevant data of the terminal device is simplified after the completion of the handover, thus further improving the handover efficiency.

Embodiment III

Figure 5:
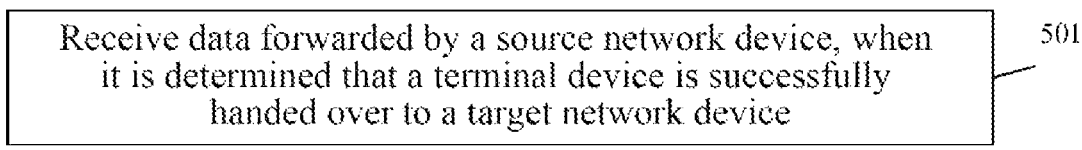
FIG. 5 is a third schematic flowchart of a data transmission method according to an embodiment of the present application.

An embodiment of the present disclosure provides a data transmission method, which is applied to a target network device, and as shown in FIG. 5, the method includes act 501.

In act 501, data forwarded by a source network device is received, when it is determined that a terminal device is successfully handed over to the target network device.

This embodiment may be applied to the following scenarios: one is that the terminal device acquires at least one target network device, then selects one target network device from the at least one target network device and initiates a handover connection to the selected target network device, at this time, the terminal device may maintain the connection with the source network device, or may disconnect from the source network device; and the other is that the source network device determines at least one network device that the terminal device can access, then selects a target network device from the at least one network device for the terminal device, and sends the selected target network device to the terminal device, so that the terminal device can initiate a connection to the target network device, at this time, the source network device may also maintain the connection with the terminal device, and of course, may alternatively disconnect from the terminal device.

Before forwarding data to the target network device, or when it is determined that the terminal device is successfully handed over to the target network device, the method further includes: sending identity information of the target network device to the source network device.

The way of receiving identity information of the target network device may be as follows: when the source network device maintains connection with the terminal device, receiving identity information, sent by the terminal device, of the target network device to which the terminal device is successfully handed over; or receiving identity information sent by the target network device; when the source network device is disconnected from the terminal device, receiving identity information sent by the target network device. The target network device may carry the identity information through network signaling or indication information.

The receiving data forwarded by the source network device includes: receiving uplink data and/or downlink data forwarded by the source network device.

As to the processing of forwarding data, reference may be made to the following processing flow. The source network device may acquire corresponding information of the target network device from at least one target network device. The flow of handover and acquiring relevant information may be as shown in FIG. 3, which includes a handover preparation stage, a handover execution stage and a handover completion stage.

The handover preparation stage includes acts 1-6 in the figure. The source network device sends a measurement control to the terminal device. The terminal device sends measurement reports to the source network device after performing measurements for a plurality of network devices or cells. The source network device makes a handover decision according to the measurement reports (or combined with RRM information). The source network device sends a handover request to the target network device so that the target network device is ready for handover. The target network device performs a handover permission control according to the handover request. When determining to perform handover, the target network device sends handover request acknowledgement to the source network device.

The process then proceeds to the handover execution stage, which includes acts 7-11 in the figure. Specifically, the target network device generates RRC information, and send RRC connection reconfiguration information to the source network device, and the source network device sends the RRC connection reconfiguration information to the terminal device. After receiving the RRC connection reconfiguration information, the terminal device performs handover processing according to the connection reconfiguration information. The source network device then forwards data to the target network device. The terminal device synchronizes with the target network device, then receives UL allocation from the target network device, and sends RRC connection reconfiguration completion information to the target network device.

The process finally proceeds to the handover completion stage, which includes acts 12-18 in the figure. Specifically, the target network device sends a path switch request to MME to inform the MME of the cell change of the terminal device. The MME sends a modify bearer request to a serving gateway, and the serving gateway performs processing of switching a downlink path. After the serving gateway completes the processing, it sends modify bearer completion information to the MME, and the MME sends an acknowledgement message of the path switch request to the target network device. The target network device informs the source network device of terminal device context release, and the source network device releases resources.

The receiving data forwarded by the source network device further includes at least one of the following: receiving a data status report forwarded by the source network device; receiving a Serial Number (SN) of a data packet on the source network device side forwarded by the source network device; or receiving Data Radio Bearer (DRB) configuration forwarded by the source network device.

Specifically, information forwarded by the source network device to the target network device may include SN status transmission information. The SN status information includes an uplink Packet Data Convergence Protocol (PDCP) SN reception status, a downlink PDCP SN transmission status, and the like. Further, the uplink PDCP SN reception status includes at least the first lost uplink SDU of the PDCP SN, and may also include a bitmap about an out-of-order reception status of uplink SDUs; and the downlink PDCP SN transmission status may include the next PDCP SN, which is a new SDU the target network device is about to allocate. In addition, other information will not be exhaustively listed here.

Further, it should be noted that a scenario of this embodiment includes a case where the terminal device maintains connection with the source network device during handover, at this time, the target network device may be a secondary node (SN), and the source network device is a master node (MN). It should be noted here that in a Long Term Evolution (LTE) system, SN is called SCG, and in New Radio (NR), it is SN, and they refer to the same concept, i.e., a second serving network device in a DC scenario. Specifically, connection states of the terminal device may be as follows: the terminal device maintains a connection with the source network device and fails to be connected with the target network device; the terminal device is disconnected from the source network device and is successfully connected with the target network device; and the terminal device fails to be connected with a Secondary Cell Group (SCG), and SCG fails to change connection. Of course, there may also be: in a scenario where there are a plurality of SCGs configured, the terminal device fails to be connected to an SCG; and in a scenario where there are a plurality of target cells configured, the terminal device fails to be connected to a target cell. There may also be other applicable scenarios, which, however, will not be exhaustively listed in this embodiment.

In addition, in the above scenarios, when initiating a connection to a first target network device while maintaining the connection with the source network device, the terminal device in this embodiment may also reserve the connection with the source network device. The terminal device reserves a first protocol stack and a first related key with the source network device, and maintains a second protocol stack and a second related key with the first target network device, wherein the first related key is different from the second related key. The second related key may be generated by the first related key.

The first protocol stack and the second protocol stack may be the same or different, or at least partially different. For example, for a 5G system, different Service Data Adaptation Protocols (SDAP), different Packet Data Convergence Protocols (PDCP), different Radio Link Control (RLC) protocols, different Media Access Control (MAC) entities and different low layer entities may be maintained between the terminal device and the source network device, and between the terminal device and the first target network device. For a 4G system, different Packet Data Convergence Protocols (PDCP), different Radio Link Control (RLC) protocols, different Media Access Control (MAC) entities and different low layer entities may be maintained between the terminal device and the source network device, and between the terminal device and the first target network device. In addition, in a solution provided in this embodiment, in order to ensure the use of different keys, the PDCPs of the first protocol stack and the second protocol stack must be different. At least one of SDAPs, RLCs, MACs or physical layers may be the same or different. Alternatively, the first protocol stack and the second protocol stack may share at least one of SDAP, RLC, MAC or physical layer, or may each have a SDAP, RLC, MAC and physical layer.

In another scenario of this embodiment, the source network device may configure a plurality of target network devices for the terminal device. In this case, before the forwarding data to the target network device when it is determined that the terminal device is successfully handed over to the target network device, the source network device sends a handover command to the terminal device, wherein the handover command is used for indicating at least one target network device to the terminal device. That is, when the source network device configures a plurality of target network devices for the terminal device, correspondingly, the terminal device will select one of them as a target network device to which connection is initiated currently, and at this time, the terminal device may maintain connection with the source network device or may disconnect from the source network device.

The handover command contains a reconfiguration message of at least one target network device. The source network device may select to send reconfiguration messages of a plurality of target network devices to the terminal device at one time, or send a reconfiguration message of only one target network device at one time, but perform sending a plurality of times. For example, after the handover to one target network device fails, the source network device further sends a reconfiguration message of another new target network device, which will not be described further.

As can be seen, by adopting the above solution, data transmission may be performed from a source network device to a target network device, after a terminal device is successfully connected with the target network device. In this way, this solution proposes a new scenario in which data is sent by a source network device, thus making this solution applicable to more handover scenarios.

Embodiment IV

Figure 6:
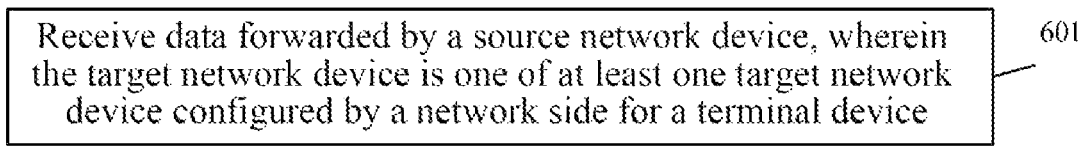
FIG. 6 is a fourth schematic flowchart of a data transmission method according to an embodiment of the present application.

An embodiment of the present disclosure provides a data transmission method, which is applied to a target network device, and as shown in FIG. 6, the method includes act 601.

In act 601, data forwarded by a source network device is received, wherein the target network device is one of at least one target network device configured by a network side for a terminal device.

Different from Embodiment III, in this embodiment, there is no such restriction that the terminal device needs to successfully establish a connection with the target network device in order to send data, instead, the terminal device directly sends data to a plurality of target network devices.

This embodiment may be applied to the scenario that the terminal device acquires at least one target network device, then selects one target network device from the at least one target network device and initiates a handover connection to the selected target network device, at this time, the terminal device may maintain the connection with the source network device, or may disconnect from the source network device.

The receiving data forwarded by the source network device includes: receiving uplink data and/or downlink data forwarded by the source network device.

As to the processing of forwarding data, reference may be made to the following processing flow. The source network device may acquire corresponding information of the target network device from at least one target network device. The flow of handover and acquiring relevant information may be as shown in FIG. 3, which includes a handover preparation stage, a handover execution stage and a handover completion stage.

The handover preparation stage includes acts 1-6 in the figure. The source network device sends a measurement control to the terminal device. The terminal device sends measurement reports to the source network device after performing measurements for a plurality of network devices or cells. The source network device makes a handover decision according to the measurement reports (or combined with RRM information). The source network device sends a handover request to the target network device so that the target network device is ready for handover. The target network device performs a handover permission control according to the handover request. When determining to perform handover, the target network device sends handover request acknowledgement to the source network device.

The process then proceeds to the handover execution stage, which includes acts 7-11 in the figure. Specifically, the target network device generates RRC information, and sends RRC connection reconfiguration information to the source network device, and the source network device sends the RRC connection reconfiguration information to the terminal device. After receiving the RRC connection reconfiguration information, the terminal device performs handover processing according to the connection reconfiguration information. The source network device then forwards data to the target network device. The terminal device synchronizes with the target network device, then receives UL allocation from the target network device, and sends RRC connection reconfiguration completion information to the target network device.

The process finally proceeds to the handover completion stage, which includes acts 12-18 in the figure. Specifically, the target network device sends a path switch request to MME to inform the MME of the cell change of the terminal device. The MME sends a modify bearer request to a serving gateway, and the serving gateway performs processing of switching a downlink path. After the serving gateway completes the processing, it sends modify bearer completion information to the MME, and the MME sends an acknowledgement message of the path switch request to the target network device. The target network device informs the source network device of terminal device context release, and the source network device releases resources.

The receiving data forwarded by the source network device further includes at least one of the following: receiving a data status report forwarded by the source network device; receiving a Serial Number (SN) of a data packet on the source network device side forwarded by the source network device; or receiving Data Radio Bearer (DRB) configuration forwarded by the source network device.

Specifically, information forwarded by the source network device to the target network device may include SN status transmission information. The SN status information includes an uplink Packet Data Convergence Protocol (PDCP) SN reception status, a downlink PDCP SN transmission status, and the like. Further, the uplink PDCP SN reception status includes at least the first lost uplink SDU of the PDCP SN, and may also include a bitmap about an out-of-order reception status of uplink SDUs; and the downlink PDCP SN transmission status may include the next PDCP SN, which is a new SDU the target network device is about to allocate. In addition, other information will not be exhaustively listed here.

Further, it should be noted that the target network device may be a secondary node (SN), and the source network device is a master node (MN). It should be noted here that in a Long Term Evolution (LTE) system, SN is called SCG, and in New Radio (NR), it is SN, and they refer to the same concept, i.e., a second serving network device in a DC scenario. Specifically, connection states of the terminal device may be: the terminal device maintains a connection with the source network device and fails to be connected with the target network device; the terminal device is disconnected from the source network device and is successfully connected with the target network device; and the terminal device fails to be connected with a Secondary Cell Group (SCG), and SCG fails to change connection. Of course, there may also be: in a scenario where there is a plurality of SCGs configured, the terminal device fails to be connected to an SCG; and in a scenario where there is a plurality of target cells configured, the terminal device fails to be connected to a target cell. There may also be other applicable scenarios, which, however, will not be exhaustively listed in this embodiment.

In a scenario of this embodiment, the source network device may configure a plurality of target network devices for the terminal device. In this case, after the receiving data forwarded by the source network device, the method further includes: reserving the data sent by the source network device, when the target network device is successfully connected with the terminal device; and discarding the data sent by the source network device, when the target network device fails to be connected with the terminal device.

That is, as soon as the target network device connects with the terminal device, it starts to receive data sent by the source network device; and when determining that the establishment of the connection between the target network device and the terminal device succeeds or fails, it determines whether to reserve the data sent by the source network device. In this way, the handover efficiency can be ensured without increasing the storage load of the network device.

As can be seen, by adopting the above solution, a source network device may directly transmit data to at least one target network device of a terminal device. In this way, this solution proposes a new scenario in which data is sent by a source network device, thus making this solution applicable to more handover scenarios. Moreover, since the source network device can directly send data to the target network device, in this solution, the procedures of acquiring relevant data of the terminal device are reduced after the completion of the handover, thus further improving the handover efficiency.

Embodiment V

Figure 7:
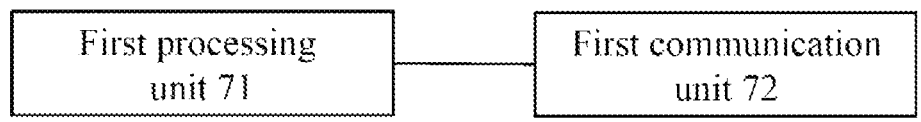
FIG. 7 is a schematic diagram of a composition structure of a terminal device according to an embodiment of the present application.

An embodiment of the present disclosure provides a source network device, as shown in FIG. 7, including a first processing unit 71 and a first communication unit 72.

The first processing unit 71 forwards data to a target network device via the first communication unit, when determining that a terminal device is successfully handed over to the target network device.

The first communication unit 72 is configured to send data to the target network device.

This embodiment may be applied to the following scenarios: one is that the terminal device acquires at least one target network device, then selects one target network device from the at least one target network device and initiates a handover connection to the selected target network device, at this time, the terminal device may maintain the connection with the source network device, or may disconnect from the source network device; and the other is that the source network device determines at least one network device that the terminal device can access, then selects a target network device from the at least one network device for the terminal device, and sends the selected target network device to the terminal device, so that the terminal device can initiate a connection to the target network device, at this time, the source network device may maintain the connection with the terminal device, and of course, may alternatively disconnect from the terminal device.

Before forwarding data to the target network device, or when it is determined that the terminal device is successfully handed over to the target network device, the first communication unit 72 receives identity information of the target network device.

The way of receiving identity information of the target network device may be as follows: when the source network device maintains connection with the terminal device, receiving identity information, sent by the terminal device, of the target network device to which the terminal device is successfully handed over; or receiving identity information sent by the target network device; when the source network device is disconnected from the terminal device, receiving identity information sent by the target network device. The target network device may carry the identity information through network signaling or indication information.

The forwarding data to the target network device includes: forwarding uplink data and/or downlink data to the target network device.

As to the processing of forwarding data, reference may be made to the following processing flow. The source network device may acquire corresponding information of the target network device from at least one target network device. The flow of handover and acquiring relevant information may be as shown in FIG. 3, which includes a handover preparation stage, a handover execution stage and a handover completion stage.

The handover preparation stage includes acts 1-6 in the figure. The source network device sends a measurement control to the terminal device. The terminal device sends measurement reports to the source network device after performing measurements for a plurality of network devices or cells. The source network device makes a handover decision according to the measurement reports (or combined with RRM information). The source network device sends a handover request to the target network device so that the target network device is ready for handover. The target network device performs a handover permission control according to the handover request. When determining to perform handover, the target network device sends handover request acknowledgement to the source network device.

The process then proceeds to the handover execution stage, which includes acts 7-11 in the figure. Specifically, the target network device generates RRC information, and sends RRC connection reconfiguration information to the source network device, and the source network device sends the RRC connection reconfiguration information to the terminal device. After receiving the RRC connection reconfiguration information, the terminal device performs handover processing according to the connection reconfiguration information. The source network device then forwards data to the target network device. The terminal device synchronizes with the target network device, then receives UL allocation performed by the target network device, and sends RRC connection reconfiguration completion information to the target network device.

The process finally proceeds to the handover completion stage, which includes acts 12-18 in the figure. Specifically, the target network device sends a path switch request to MME to inform the MME of the cell change of the terminal device. The MME sends a modify bearer request to a serving gateway, and the serving gateway performs processing of switching a downlink path. After the serving gateway completes the processing, it sends modify bearer completion information to the MME, and the MME sends an acknowledgement message of the path switch request to the target network device. The target network device informs the source network device of terminal device context release, and the source network device releases resources.

The first communication unit 72 performs at least one of the following: sending a data status report to the target network device; sending a Serial Number (SN) of a data packet on the source network device side to the target network device; or sending Data Radio Bearer (DRB) configuration to the target network device.

Specifically, information forwarded by the source network device to the target network device may include SN status transmission information. The SN status information includes an uplink Packet Data Convergence Protocol (PDCP) SN reception status, a downlink PDCP SN transmission status, and the like. Further, the uplink PDCP SN reception status includes at least the first lost uplink SDU of the PDCP SN, and may also include a bitmap about an out-of-order reception status of uplink SDUs; and the downlink PDCP SN transmission status may include the next PDCP SN, which is a new SDU the target network device is about to allocate. In addition, other information will not be exhaustively listed here.

Further, it should be noted that a scenario of this embodiment includes a case where the terminal device maintains connection with the source network device during handover, at this time, the target network device may be a secondary node (SN), and the source network device is a master node (MN). It should be noted here that in a Long Term Evolution (LTE) system, SN is called SCG, and in New Radio (NR), it is SN, and they refer to the same concept, i.e., a second serving network device in a DC scenario. Specifically, connection states of the terminal device may be: the terminal device maintains connection with the source network device and fails to be connected with the target network device; the terminal device is disconnected from the source network device and is successfully connected with the target network device; and the terminal device fails to be connected with a Secondary Cell Group (SCG), and SCG fails to change connection. Of course, there may also be: in a scenario where there are a plurality of SCGs configured, the terminal device fails to be connected to an SCG; and in a scenario where there are a plurality of target cells configured, the terminal device fails to be connected to a target cell. There may also be other applicable scenarios, which, however, will not be exhaustively listed in this embodiment.

In addition, in the above scenarios, when initiating a connection to a first target network device while maintaining the connection with the source network device, the terminal device in this embodiment may reserve the connection with the source network device. The terminal device reserves a first protocol stack and a first related key with the source network device, and maintains a second protocol stack and a second related key with the first target network device, wherein the first related key is different from the second related key. The second related key may be generated by the first related key.

The first protocol stack and the second protocol stack may be the same or different, or at least partially different. For example, for a 5G system, different Service Data Adaptation Protocols (SDAP), different Packet Data Convergence Protocols (PDCP), different Radio Link Control (RLC) protocols, different Media Access Control (MAC) entities and different low layer entities may be maintained between the terminal device and the source network device, and between the terminal device and the first target network device. For a 4G system, different Packet Data Convergence Protocols (PDCP), different Radio Link Control (RLC) protocols, different Media Access Control (MAC) entities and different low layer entities may be maintained between the terminal device and the source network device, and between the terminal device and the first target network device. In addition, in a solution provided in this embodiment, in order to ensure the use of different keys, the PDCPs of the first protocol stack and the second protocol stack must be different. At least one of SDAPs, RLCs, MACs or physical layers may be the same or different. Alternatively, the first protocol stack and the second protocol stack may share at least one of SDAP, RLC, MAC or physical layer, or may each have a SDAP, RLC, MAC and physical layer.

In another scenario of this embodiment, the source network device may configure a plurality of target network devices for the terminal device. In this case, before the forwarding data to the target network device, when it is determined that the terminal device is successfully handed over to the target network device, a handover command is sent to the terminal device, wherein the handover command is used for indicating at least one target network device to the terminal device. That is, when the source network device configures a plurality of target network devices for the terminal device, correspondingly, the terminal device will select one of them as a target network device to which connection is initiated currently, and at this time, the terminal device may maintain connection with the source network device or may disconnect from the source network device.

The handover command contains a reconfiguration message of at least one target network device. The source network device may select to send reconfiguration messages of a plurality of target network devices to the terminal device at one time, or send a reconfiguration message of only one target network device at one time, but perform sending a plurality of times. For example, after the handover to one target network device fails, the source network device further sends a reconfiguration message of another new target network device, which will not be described further.

As can be seen, by adopting the above solution, data transmission may be performed from a source network device to a target network device, after a terminal device is successfully connected with the target network device. In this way, this solution proposes a new scenario in which data is sent by a source network device, thus making this solution applicable to more handover scenarios.

Embodiment VI

An embodiment of the present disclosure provides a source network device, including a second communication unit. The second communication unit forwards data to at least one target network device.

In this embodiment, there is no such restriction that the terminal device needs to successfully establish a connection with the target network device in order to send data, instead, the terminal device directly sends data to a plurality of target network devices.

This embodiment may be applied to the scenario that the terminal device acquires at least one target network device, then selects one target network device from the at least one target network device and initiates a handover connection to the selected target network device, at this time, the terminal device may maintain the connection with the source network device, or may disconnect from the source network device.

The second communication unit forwards uplink data and/or downlink data to the target network device.

As to the processing of forwarding data, reference may be made to the following processing flow. The source network device may acquire corresponding information of the target network device from at least one target network device. The flow of handover and acquiring relevant information may be as shown in FIG. 3, which includes a handover preparation stage, a handover execution stage and a handover completion stage.

The handover preparation stage includes acts 1-6 in the figure. The source network device sends a measurement control to the terminal device. The terminal device sends measurement reports to the source network device after performing measurements for a plurality of network devices or cells. The source network device makes a handover decision according to the measurement reports (or combined with RRM information). The source network device sends a handover request to the target network device so that the target network device is ready for handover. The target network device performs a handover permission control according to the handover request. When determining to perform handover, the target network device sends handover request acknowledgement to the source network device.

The process then proceeds to the handover execution stage, which includes acts 7-11 in the figure. Specifically, the target network device generates RRC information, and sends RRC connection reconfiguration information to the source network device, and the source network device sends the RRC connection reconfiguration information to the terminal device. After receiving the RRC connection reconfiguration information, the terminal device performs handover processing according to the connection reconfiguration information. The source network device then forwards data to the target network device. The terminal device synchronizes with the target network device, then receives UL allocation performed by the target network device, and sends RRC connection reconfiguration completion information to the target network device.

The process finally proceeds to the handover completion stage, which includes acts 12-18 in the figure. Specifically, the target network device sends a path switch request to MME to inform the MME of the cell change of the terminal device. The MME sends a modify bearer request to a serving gateway, and the serving gateway performs processing of switching a downlink path. After the serving gateway completes the processing, it sends modify bearer completion information to the MME, and the MME sends an acknowledgement message of the path switch request to the target network device. The target network device informs the source network device of terminal device context release, and the source network device releases resources.

The second communication unit further performs at least one of the following: sending a data status report to the target network device; sending a Serial Number (SN) of a data packet on the source network device side to the target network device; or sending Data Radio Bearer (DRB) configuration to the target network device.

Specifically, information forwarded by the source network device to the target network device may include SN status transmission information. The SN status information includes an uplink Packet Data Convergence Protocol (PDCP) SN reception status, a downlink PDCP SN transmission status, and the like. Further, the uplink PDCP SN reception status includes at least the first lost uplink SDU of the PDCP SN, and may also include a bitmap about an out-of-order reception status of uplink SDUs; and the downlink PDCP SN transmission status may include the next PDCP SN, which is a new SDU the target network device is about to allocate. In addition, other information will not be exhaustively listed here.

Further, it should be noted that the target network device may be a secondary node (SN), and the source network device is a master node (MN). It should be noted here that in a Long Term Evolution (LTE) system, SN is called SCG, and in New Radio (NR), it is SN, and they refer to the same concept, i.e., a second serving network device in a DC scenario. Specifically, connection states of the terminal device may be: the terminal device maintains connection with the source network device and fails to be connected with the target network device; the terminal device is disconnected from the source network device and is successfully connected with the target network device; and the terminal device fails to be connected with a Secondary Cell Group (SCG), and SCG fails to change connection. Of course, there may also be: in a scenario where there are a plurality of SCGs configured, the terminal device fails to be connected to an SCG; and in a scenario where there are a plurality of target cells configured, the terminal device fails to be connected to a target cell. There may also be other applicable scenarios, which, however, will not be exhaustively listed in this embodiment.

In a scenario of this embodiment, the source network device may configure a plurality of target network devices for the terminal device. In this case, before the forwarding data to at least one target network device, the second communication unit sends a handover command to the terminal device, wherein the handover command is used for indicating the at least one target network device to the terminal device.

That is, when the source network device configures a plurality of target network devices for the terminal device, correspondingly, the terminal device will select one of them as a target network device to which connection is initiated currently, and at this time, the terminal device may maintain connection with the source network device or may disconnect from the source network device.

The handover command contains a reconfiguration message of at least one target network device. The source network device may select to send reconfiguration messages of a plurality of target network devices to the terminal device at one time, or send a reconfiguration message of only one target network device at one time, but perform sending a plurality of times. For example, after the handover to one target network device fails, the source network device further sends a reconfiguration message of another new target network device, which will not be described further.

As can be seen, by adopting the above solution, a source network device may directly transmit data to at least one target network device of a terminal device. In this way, this solution proposes a new scenario in which data is sent by a source network device, thus making this solution applicable to more handover scenarios. Moreover, since the source network device can directly send data to the target network device, in this solution, the procedures of acquiring relevant data of the terminal device are reduced after the completion of the handover, thus further improving the handover efficiency.

Embodiment VII

Figure 8:
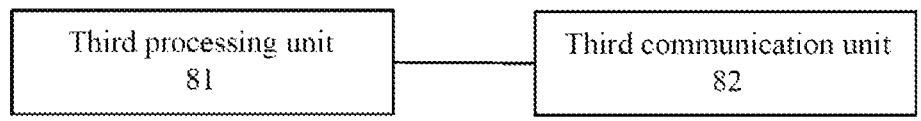
FIG. 8 is a first schematic diagram of a composition structure of a network device according to an embodiment of the present disclosure.

An embodiment of the present disclosure provides a target network device, as shown in FIG. 8, including a third processing unit 81 and a third communication unit 82.

The third processing unit 81 receives, via the third communication unit, data forwarded by a source network device, when determining that a terminal device is successfully handed over to the target network device.

The third communication unit 82 receives data sent by the source network device.

This embodiment may be applied to the following scenarios: one is that the terminal device acquires at least one target network device, then selects one target network device from the at least one target network device and initiates a handover connection to the selected target network device, at this time, the terminal device may maintain the connection with the source network device, or may disconnect from the source network device; and the other is that the source network device determines at least one network device that the terminal device can access, then selects a target network device from the at least one network device for the terminal device, and sends the selected target network device to the terminal device, so that the terminal device can initiate a connection to the target network device, at this time, the source network device may maintain the connection with the terminal device, and of course, may disconnect from the terminal device.

Before receiving data sent by the source network device, or when it is determined that the terminal device is successfully handed over to the target network device, the third communication unit 82 sends identity information of the target network device to the source network device.

The way of receiving identity information of the target network device may be as follows: when the source network device maintains connection with the terminal device, receiving identity information, sent by the terminal device, of the target network device to which the terminal device is successfully handed over; or receiving identity information sent by the target network device; when the source network device is disconnected from the terminal device, receiving identity information sent by the target network device. The target network device may carry the identity information through network signaling or indication information.

The receiving data forwarded by the source network device includes: receiving uplink data and/or downlink data forwarded by the source network device.

As to the processing of forwarding data, reference may be made to the following processing flow. The source network device may acquire corresponding information of the target network device from at least one target network device. The flow of handover and acquiring relevant information may be as shown in FIG. 3, which includes a handover preparation stage, a handover execution stage and a handover completion stage.

The handover preparation stage includes acts 1-6 in the figure. The source network device sends a measurement control to the terminal device. The terminal device sends measurement reports to the source network device after performing measurements for a plurality of network devices or cells. The source network device makes a handover decision according to the measurement reports (or combined with RRM information). The source network device sends a handover request to the target network device so that the target network device is ready for handover. The target network device performs a handover permission control according to the handover request. When determining to perform handover, the target network device sends handover request acknowledgement to the source network device.

The process then proceeds to the handover execution stage, which includes acts 7-11 in the figure. Specifically, the target network device generates RRC information, and sends RRC connection reconfiguration information to the source network device, and the source network device sends the RRC connection reconfiguration information to the terminal device. After receiving the RRC connection reconfiguration information, the terminal device performs handover processing according to the connection reconfiguration information. The source network device then forwards data to the target network device. The terminal device synchronizes with the target network device, then receives UL allocation from the target network device, and sends RRC connection reconfiguration completion information to the target network device.

The process finally proceeds to the handover completion stage, which includes acts 12-18 in the figure. Specifically, the target network device sends a path switch request to MME to inform the MME of the cell change of the terminal device. The MME sends a modify bearer request to a serving gateway, and the serving gateway performs processing of switching a downlink path. After the serving gateway completes the processing, it sends modify bearer completion information to the MME, and the MME sends an acknowledgement message of the path switch request to the target network device. The target network device informs the source network device of terminal device context release, and the source network device releases resources.

The third communication unit 82 further performs at least one of the following: receiving a data status report forwarded by the source network device; receiving a Serial Number (SN) of a data packet on the source network device side forwarded by the source network device; or receiving Data Radio Bearer (DRB) configuration forwarded by the source network device.

Specifically, information forwarded by the source network device to the target network device may include SN status transmission information. The SN status information includes an uplink Packet Data Convergence Protocol (PDCP) SN reception status, a downlink PDCP SN transmission status, and the like. Further, the uplink PDCP SN reception status includes at least the first lost uplink SDU of the PDCP SN, and may also include a bitmap about an out-of-order reception status of uplink SDUs; and the downlink PDCP SN transmission status may include the next PDCP SN, which is a new SDU the target network device is about to allocate. In addition, other information will not be exhaustively listed here.

Further, it should be noted that a scenario of this embodiment includes a case where the terminal device maintains connection with the source network device during handover, at this time, the target network device may be a secondary node (SN), and the source network device is a master node (MN). It should be noted here that in a Long Term Evolution (LTE) system, SN is called SCG, and in New Radio (NR), it is SN, and they refer to the same concept, i.e., a second serving network device in a DC scenario. Specifically, connection states of the terminal device may be: the terminal device maintains a connection with the source network device and fails to be connected with the target network device; the terminal device is disconnected from the source network device and is successfully connected with the target network device; and the terminal device fails to be connected with a Secondary Cell Group (SCG), and SCG fails to change connection. Of course, there may also be: in a scenario where there are a plurality of SCGs configured, the terminal device fails to be connected to an SCG; and in a scenario where there are a plurality of target cells configured, the terminal device fails to be connected to a target cell. There may also be other applicable scenarios, which, however, will not be exhaustively listed in this embodiment.

In addition, in the above scenarios, when initiating a connection to a first target network device while maintaining the connection with the source network device, the terminal device in this embodiment may reserve the connection with the source network device. The terminal device reserves a first protocol stack and a first related key with the source network device, and maintains a second protocol stack and a second related key with the first target network device, wherein the first related key is different from the second related key. The second related key may be generated by the first related key.

The first protocol stack and the second protocol stack may be the same or different, or at least partially different. For example, for a 5G system, different Service Data Adaptation Protocols (SDAP), different Packet Data Convergence Protocols (PDCP), different Radio Link Control (RLC) protocols, different Media Access Control (MAC) entities and different low layer entities may be maintained between the terminal device and the source network device, and between the terminal device and the first target network device. For a 4G system, different Packet Data Convergence Protocols (PDCP), different Radio Link Control (RLC) protocols, different Media Access Control (MAC) entities and different low layer entities may be maintained between the terminal device and the source network device, and between the terminal device and the first target network device. In addition, in a solution provided in this embodiment, in order to ensure the use of different keys, the PDCPs of the first protocol stack and the second protocol stack must be different. At least one of SDAPs, RLCs, MACs or physical layers may be the same or different. Alternatively, the first protocol stack and the second protocol stack may share at least one of SDAP, RLC, MAC or physical layer, or may each have a SDAP, RLC, MAC and physical layer.

In another scenario of this embodiment, the source network device may configure a plurality of target network devices for the terminal device. In this case, before the forwarding data to the target network device, when it is determined that the terminal device is successfully handed over to the target network device, the source network device sends a handover command to the terminal device, wherein the handover command is used for indicating at least one target network device to the terminal device. That is, when the source network device configures a plurality of target network devices for the terminal device, correspondingly, the terminal device will select one of them as a target network device to which connection is initiated currently, and at this time, the terminal device may maintain connection with the source network device or may disconnect from the source network device.

The handover command contains a reconfiguration message of at least one target network device. The source network device may select to send reconfiguration messages of a plurality of target network devices to the terminal device at one time, or send a reconfiguration message of only one target network device at one time, but perform sending a plurality of times. For example, after the handover to one target network device fails, the source network device further sends a reconfiguration message of another new target network device, which will not be described further.

As can be seen, by adopting the above solution, data transmission may be performed from a source network device to a target network device, after a terminal device is successfully connected with the target network device. In this way, this solution proposes a new scenario in which data is sent by a source network device, thus making this solution applicable to more handover scenarios.

Embodiment VIII

Figure 9:
FIG. 9 is a second schematic diagram of a composition structure of a network device according to an embodiment of the present disclosure.

An embodiment of the present disclosure provides a target network device, as shown in FIG. 9, including a fourth communication unit 91.

The fourth communication unit 91 receives data forwarded by a source network device, wherein the target network device is one of at least one target network device configured by a network side for a terminal device.

Different from Embodiment III, in this embodiment, there is no such restriction that the terminal device needs to successfully establish a connection with the target network device in order to send data, instead, the terminal device directly sends data to a plurality of target network devices.

This embodiment may be applied to the scenario that the terminal device acquires at least one target network device, then selects one target network device from the at least one target network device and initiates a handover connection to the selected target network device, at this time, the terminal device may maintain the connection with the source network device, or may disconnect from the source network device.

The fourth communication unit 91 receives uplink data and/or downlink data forwarded by the source network device.

As to the processing of forwarding data, reference may be made to the following processing flow. The source network device may acquire corresponding information of the target network device from at least one target network device. The flow of handover and acquiring relevant information may be as shown in FIG. 3, which includes a handover preparation stage, a handover execution stage and a handover completion stage.

The handover preparation stage includes acts 1-6 in the figure. The source network device sends a measurement control to the terminal device. The terminal device sends measurement reports to the source network device after performing measurements for a plurality of network devices or cells. The source network device makes a handover decision according to the measurement reports (or combined with RRM information). The source network device sends a handover request to the target network device so that the target network device is ready for handover. The target network device performs a handover permission control according to the handover request. When determining to perform handover, the target network device sends handover request acknowledgement to the source network device.

The process then proceeds to the handover execution stage, which includes acts 7-11 in the figure. Specifically, the target network device generates RRC information, and send RRC connection reconfiguration information to the source network device, and the source network device sends the RRC connection reconfiguration information to the terminal device. After receiving the RRC connection reconfiguration information, the terminal device performs handover processing according to the connection reconfiguration information. The source network device then forwards data to the target network device. The terminal device synchronizes with the target network device, then receives UL allocation from the target network device, and sends RRC connection reconfiguration completion information to the target network device.

The process finally proceeds to the handover completion stage, which includes acts 12-18 in the figure. Specifically, the target network device sends a path switch request to MME to inform the MME of the cell change of the terminal device. The MME sends a modify bearer request to a serving gateway, and the serving gateway performs processing of switching a downlink path. After the serving gateway completes the processing, it sends modify bearer completion information to the MME, and the MME sends an acknowledgement message of the path switch request to the target network device. The target network device informs the source network device of terminal device context release, and the source network device releases resources.

The fourth communication unit 91 further performs at least one of the following: receiving a data status report forwarded by the source network device; receiving a Serial Number (SN) of a data packet on the source network device side forwarded by the source network device; or receiving Data Radio Bearer (DRB) configuration forwarded by the source network device.

Specifically, information forwarded by the source network device to the target network device may include SN status transmission information. The SN status information includes an uplink Packet Data Convergence Protocol (PDCP) SN reception status, a downlink PDCP SN transmission status, and the like. Further, the uplink PDCP SN reception status includes at least the first lost uplink SDU of the PDCP SN, and may also include a bitmap about an out-of-order reception status of uplink SDUs; and the downlink PDCP SN transmission status may include the next PDCP SN, which is a new SDU the target network device is about to allocate. In addition, other information will not be exhaustively listed here.

Further, it should be noted that the target network device may be a secondary node (SN), and the source network device is a master node (MN). It should be noted here that in a Long Term Evolution (LTE) system, SN is called SCG, and in New Radio (NR), it is SN, and they refer to the same concept, i.e., a second serving network device in a DC scenario. Specifically, connection states of the terminal device may be: the terminal device maintains a connection with the source network device and fails to be connected with the target network device; the terminal device is disconnected from the source network device and is successfully connected with the target network device; and the terminal device fails to be connected with a Secondary Cell Group (SCG), and SCG fails to change connection. Of course, there may also be: In a scenario where there are a plurality of SCGs configured, the terminal device fails to be connected to an SCG; and in a scenario where there are a plurality of target cells configured, the terminal device fails to be connected to a target cell. There may also be other applicable scenarios, which, however, will not be exhaustively listed in this embodiment.

In a scenario of this embodiment, the target network device further includes: a fourth processing unit 92, configured to reserve the data sent by the source network device, when the target network device is successfully connected with the terminal device; and discard the data sent by the source network device, when the target network device fails to be connected with the terminal device.

That is, as soon as the target network device performs connection with the terminal device, it starts to receive data sent by the source network device; and when determining that the establishment of the connection between the target network device and the terminal device succeeds or fails, it determines whether to reserve the data sent by the source network device. In this way, the handover efficiency can be ensured without increasing the storage load of the network device.

As can be seen, by adopting the above solution, a source network device may directly transmit data to at least one target network device of a terminal device. In this way, this solution proposes a new scenario in which data is sent by a source network device, thus making this solution applicable to more handover scenarios. Moreover, since the source network device can directly send data to the target network device, in this solution, the procedures of acquiring relevant data of the terminal device are reduced after the completion of the handover, thus further improving the handover efficiency.

Figure 10:
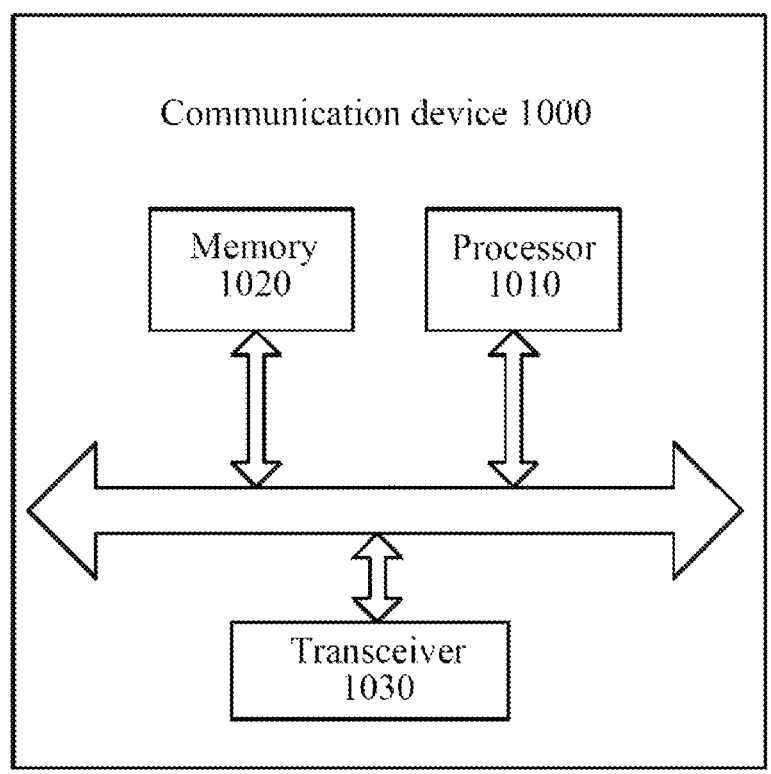
FIG. 10 is a schematic diagram of a composition structure of a communication device according to an embodiment of the present disclosure.

FIG. 10 is a schematic diagram of a composition structure of a communication device 1000 according to an embodiment of the present application. The communication device may be the terminal device or the network device described in the above embodiments. The communication device 1000 shown in FIG. 10 includes a processor 1010 that can call and run a computer program from a memory to implement the methods in the embodiments of the present application.

Optionally, as shown in FIG. 10, the communication device 1000 may further include a memory 1020. The processor 1010 may call and run a computer program from the memory 1020 to implement the methods in the embodiments of the present application.

The memory 1020 may be a separate device independent of the processor 1010 or may be integrated in the processor 1010.

Optionally, as shown in FIG. 10, the communication device 1000 may further include a transceiver 1030, and the processor 1010 may control the transceiver 1030 to communicate with other devices. Specifically, the transceiver 1030 may send information or data to other devices or receive information or data sent by other devices.

The transceiver 1030 may include a transmitter and a receiver. The transceiver 1030 may further include antennas, and the number of antennas may be one or more.

Optionally, the communication device 1000 may be specifically a network device of an embodiment of the present application, and the communication device 1000 may implement the corresponding processes implemented by the network device in various methods of the embodiments of the present application, which will not be repeated here for brevity.

Optionally, the communication device 1000 may be specifically a terminal device or a mobile terminal of an embodiment of the present application, and the communication device 1000 may implement the corresponding processes implemented by the mobile terminal/terminal device in various methods of the embodiments of the present application, which will not be repeated here for brevity.

Figure 11:
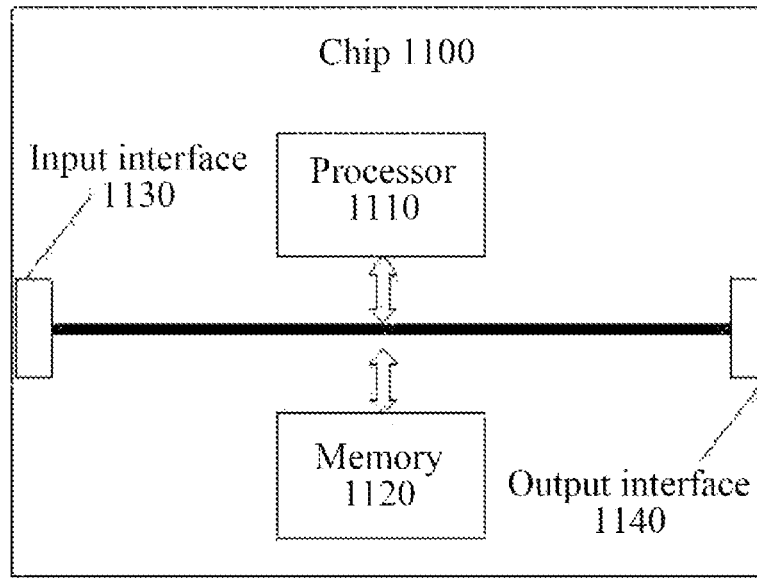
FIG. 11 is a schematic block diagram of a chip according to an embodiment of the present application.

FIG. 11 is a schematic diagram of a composition structure of a chip according to an embodiment of the present application. A chip 1100 shown in FIG. 11 includes a processor 1110. The processor 1110 may call and run a computer program from a memory to implement the methods in the embodiments of the present application.

Optionally, as shown in FIG. 11, the chip 1100 may further include a memory 1120. The processor 1110 may call and run a computer program from the memory 1120 to implement the methods in the embodiments of the present application.

The memory 1120 may be a separate device independent of the processor 1110 or may be integrated in the processor 1110.

Optionally, the chip 1100 may further include an input interface 1130. The processor 1110 may control the input interface 1130 to communicate with other devices or chips, and specifically, may acquire information or data sent by other devices or chips.

Optionally, the chip 1100 may further include an output interface 1140. The processor 1110 may control the output interface 1140 to communicate with other devices or chips, and specifically, may output information or data to other devices or chips.

Optionally, the chip may be applied to a network device of an embodiment of the present application, and the chip may implement corresponding processes implemented by the network device in various methods of the embodiments of the present application, which will not be repeated here for brevity.

Optionally, the chip may be applied to a terminal device of an embodiment of the present application, and the chip may implement corresponding processes implemented by the terminal device in various methods of the embodiments of the present application, which will not be repeated here for brevity.

It should be understood that the chip mentioned in the embodiment of the present application may also be referred to as a system-level chip, a system chip, a chip system or a system-on-chip, etc.

Figure 12:
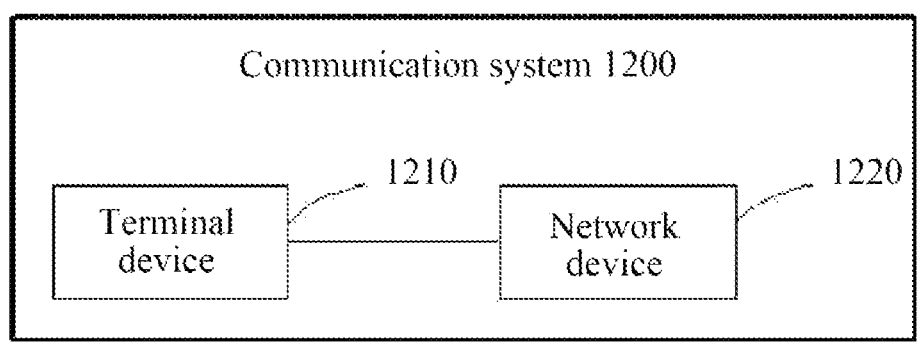
FIG. 12 is a second schematic diagram of an architecture of a communication system according to an embodiment of the present application.

FIG. 12 is a schematic block diagram of a communication system 1200 according to an embodiment of the present application. As shown in FIG. 12, the communication system 1200 includes a terminal device 1210 and a network device 1220.

Herein, the terminal device 1210 may be configured to implement corresponding functions implemented by the terminal device in the above-mentioned methods, and the network device 1220 may be configured to implement corresponding functions implemented by the network device in the above-mentioned methods, which will not be repeated here for brevity.

It should be understood that the processor in the embodiment of this application may be an integrated circuit chip having a signal processing capability. In an implementation process, the steps of the foregoing method embodiments may be implemented by an integrated logic circuit of hardware in the processor or instructions in a form of software. The processor may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or execute methods, acts and logical block diagrams disclosed in the embodiments of this application. The general purpose processor may be a microprocessor, or the processor may be any conventional processor or the like. The acts of the methods disclosed with reference to the embodiments of this application may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in a memory, and the processor reads the information in the memory and completes the acts of the above methods in combination with its hardware.

It may be understood that the memory in the embodiment of this application may be a transitory memory or a non-transitory memory, or may include both a transitory memory and a non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. By way of exemplary but not restrictive illustrations, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and methods described here is intended to include, without being limited to, these and any other suitable types of memory.

It should be understood that the foregoing memory is an example for illustration, but not for limiting. For example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, memories in the embodiments of the present application are intended to include, without being limited to, these and any other suitable types of memories.

An embodiment of the present application further provides a computer readable storage medium for storing a computer program.

Optionally, the computer readable storage medium may be applied to a network device of an embodiment of the present application, and the computer program enables a computer to perform corresponding processes implemented by the network device in various methods of the embodiments of the present application, which will not be repeated here for brevity.

Optionally, the computer readable storage medium may be applied to a terminal device of an embodiment of the present application, and the computer program enables a computer to perform corresponding processes implemented by the mobile terminal/terminal device in various methods of the embodiments of the present application, which will not be repeated here for brevity.

An embodiment of the present application also provides a computer program product including computer program instructions.

Optionally, the computer program product may be applied to a network device of an embodiment of the present application, and the computer program instructions enable a computer to perform corresponding processes implemented by the network device in various methods of the embodiments of the present application, which will not be repeated here for brevity.

Optionally, the computer program product may be applied to a mobile terminal/terminal device of an embodiment of the present application, and the computer program instructions enable a computer to perform corresponding processes implemented by the mobile terminal/terminal device in various methods of the embodiments of the present application, which will not be repeated here for brevity.

An embodiment of the present application also provides a computer program.

Optionally, the computer program may be applied to a network device of an embodiment of the present application. When run on a computer, the computer program enables the computer to execute corresponding processes implemented by the network device in various methods of the embodiments of the present application, which will not be repeated here for brevity.

Optionally, the computer program may be applied to a mobile terminal/terminal device of an embodiment of the present application. When run on a computer, the computer program enables the computer to execute corresponding processes implemented by the mobile terminal/terminal device in various methods of the embodiments of the present application, which will not be repeated here for brevity.

Those of ordinary skills in the art may recognize that the exemplary units and algorithm steps described in combination with the embodiments disclosed herein may be implemented in electronic hardware, or a combination of computer software and electronic hardware. Whether these functions are implemented in hardware or software depends on the specific application and design constraints of the technical solutions. Skilled artisans may use different methods to implement the described functions in respect to each particular application, but such implementation should not be considered to be beyond the scope of the present application.

Those skilled in the art may clearly understand that for convenience and conciseness of description, as to the specific working processes of the systems, apparatuses and units described above, reference may be made to the corresponding processes in the method embodiments, which will not be repeated here.

In several embodiments provided by the present application, it should be understood that the disclosed systems, apparatuses and methods may be implemented in other ways. For example, the apparatus embodiments described above are only illustrative, for example, the division of the units is only a logical function division, and there may be other division manners in actual implementation, for example, a plurality of units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The unit described as a separate component may or may not be physically separated, and the component shown as a unit may or may not be a physical unit, i.e., it may be located in one place or may be distributed over a plurality of network units. Some or all of the units may be selected according to actual needs to achieve the objects of the solutions of the embodiments.

In addition, various functional units in various embodiments of the present application may be integrated in one processing unit, or the various units may be physically present separately, or two or more units may be integrated in one unit.

The functions may be stored in a computer readable storage medium if implemented in a form of software functional units and sold or used as a separate product. Based on this understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the methods described in various embodiments of the present application. The storage medium includes various mediums capable of storing program codes, such as a USB flash disk, a removable hard disk, a Read-Only Memory (ROM), a Random Access Memory (RAM), a magnetic disk, or an optical disk.

What are described above are merely exemplary embodiments of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be determined by the protection scope of the claims.

What we claim is:

1. A data transmission method, applied to a source network device, the method comprising:
    forwarding data to a target network device when determining that a terminal device is successfully handed over to the target network device, wherein when the terminal device initiates a handover to the target network device, the terminal device maintains a connection with the source network device,
    wherein before forwarding data to the target network device when determining that the terminal device is successfully handed over to the target network device, the method further comprises:
    sending a handover command to the terminal device, wherein the handover command is used for indicating at least two target network devices to the terminal device,
    wherein the handover command contains connection reconfiguration information of the at least two target network devices,
    wherein when determining that the terminal device is successfully handed over to the target network device, the method further comprises:
    receiving identity information of the target network device sent by the target network device.

2. The method according to claim 1, wherein forwarding data to the target network device comprises:
    forwarding uplink data and/or downlink data to the target network device.

3. The method according to claim 2, wherein forwarding data to the target network device further comprises at least one of the following:
    sending a data status report to the target network device;
    sending a Serial Number (SN) of a data packet on the source network device side to the target network device; or
    sending Data Radio Bearer (DRB) configuration to the target network device.

4. A source network device, comprising:
    a processor, configured to forward data to a target network device via a transceiver, when determining that a terminal device is successfully handed over to the target network device, wherein when the terminal device initiates a handover to the target network device, the terminal device maintains a connection with the source network device; and the transceiver, configured to send data to the target network device, wherein the transceiver is further configured to send a handover command to the terminal device, wherein the handover command is used for indicating at least two target network devices to the terminal device, wherein the handover command contains connection reconfiguration information of the at least two target network devices, wherein the transceiver is further configured to receive identity information of the target network device sent by the target network device when determining that the terminal device is successfully handed over to the target network device.

5. The source network device according to claim 4, wherein the transceiver is configured to forward uplink data and/or downlink data to the target network device.

6. The source network device according to claim 5, wherein the transceiver is further configured to perform at least one of the following:
   sending a data status report to the target network device;
   sending a Serial Number (SN) of a data packet on the source network device side to the target network device; or
   sending Data Radio Bearer (DRB) configuration to the target network device.

7. A target network device, comprising:
a processor, configured to receive, via a transceiver, data forwarded by a source network device, when determining that a terminal device is successfully handed over to the target network device, wherein when the terminal device initiates a handover to the target network device, the terminal device maintains a connection with the source network device; and the transceiver, configured to receive data sent by the source network device, wherein the transceiver is further configured to:

send connection reconfiguration information to the source network device, wherein connection reconfiguration information of at least two target network devices is sent to the terminal device by the source network device, wherein the transceiver is further configured to send identity information of the target network device to the source network device when determining that the terminal device is successfully handed over to the target network device.

8. The target network device according to claim 7, wherein the transceiver is configured to receive uplink data and/or downlink data forwarded by the source network device.

9. The target network device according to claim 8, wherein the transceiver is further configured to perform at least one of the following:
   receiving a data status report forwarded by the source network device;
   receiving a Serial Number (SN) of a data packet on the source network device side forwarded by the source network device; or
   receiving Data Radio Bearer (DRB) configuration forwarded by the source network device.

10. A non-transitory computer readable storage medium, wherein the computer readable storage medium is used for storing a computer program that enables a computer to implement acts of the method according to claim 1.

* * * * *